United States Patent
Hamada et al.

(10) Patent No.: US 6,899,971 B2
(45) Date of Patent: May 31, 2005

(54) GAS DIFFUSION LAYER ARRANGEMENT FOR A FUEL CELL

(75) Inventors: Akira Hamada, Moriguchi (JP); Kunihiro Nakato, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 349 days.

(21) Appl. No.: 09/998,912

(22) Filed: Dec. 3, 2001

(65) Prior Publication Data

US 2002/0068215 A1 Jun. 6, 2002

(30) Foreign Application Priority Data

Dec. 4, 2000 (JP) ........................................ 2000-368986

(51) Int. Cl.[7] .......................... H01M 4/86; H01M 4/90; H01M 4/96; H01M 2/14
(52) U.S. Cl. ............................... 429/40; 429/42; 429/39
(58) Field of Search ............................. 429/40, 42, 34, 429/38, 241, 232, 233

(56) References Cited

U.S. PATENT DOCUMENTS

| | | | |
|---|---|---|---|
| 3,793,085 A | * | 2/1974 | Hino et al. ................. 429/42 |
| 4,301,218 A | * | 11/1981 | Benczur-urmossy ......... 429/42 |
| 5,500,292 A | * | 3/1996 | Muranaka et al. .......... 429/209 |
| 5,863,673 A | * | 1/1999 | Campbell et al. ............ 429/44 |

* cited by examiner

Primary Examiner—Patrick Joseph Ryan
Assistant Examiner—Julian Mercado
(74) Attorney, Agent, or Firm—Armstrong, Kratz, Quintos, Hanson & Brooks, LLP

(57) ABSTRACT

An inexpensive gas diffusion layer arrangement for fuel cell excellent in gas permeability, water repellence, and also excellent in mechanical strength, allowing a continuous formation. The gas diffusion layer arrangement is used for at least one of gas diffusion layers of a fuel cell where a fuel electrode side catalyst layer and an air electrode side catalyst layer are disposed at both faces of an electrolyte film, and further a gas diffusion layer arrangement is disposed respectively on the outer surface of the fuel electrode side catalyst layer and air electrode side catalyst layer, wherein the gas diffusion layer is formed of a mesh sheet having a heat resistance and an acid resistance, and a mixture of electrically conductive powder and water repellent filler for filling voids of the mesh sheet.

5 Claims, 4 Drawing Sheets

GAS DIFFUSION LAYER ARRANGEMENT FOR A FUEL CELL

BACKGROUND OF THE INVENTION

1. Field of the Invention

The present invention is directed to a gas diffusion layer arrangement for a fuel cell.

2. Description of the Related Art

FIG. 6 is an exploded cross-sectional view showing a basic configuration of an element cell of a solid polymer type fuel cell which is one embodiment of the conventional fuel cell. A cell is constructed by bonding an air electrode (cathode) side catalyst layer 2 containing a noble metal (mainly platinum) and a fuel electrode (anode) side catalyst layer 3 respectively to main faces at the both sides of a solid polymer electrolyte film 1. An air electrode side gas diffusion layer 4 and a fuel electrode side gas diffusion layer 5 are disposed respectively in opposition to the air electrode side catalyst layer 2 and the fuel electrode side catalyst layer 3. Thereby, an air electrode 6 and a fuel electrode 7 are configured respectively. These gas diffusion layers 4 and 5 function to pass an oxidant gas and a fuel gas, respectively, and, at the same time, to make the current flow to the outside. Then, an element cell 11 is configured by providing a gas passage 8 for reaction gas communication facing the cell, and pinching with a set of separators 10 provided with a cooling water passage 9 for cooling water communication on the opposed main faces and formed of an electrically conductive and gas impermeable material.

FIG. 7 is a cross-section view showing a basic composition of a solid polymer type fuel cell stack. A number of element cells 11 are stacked, sandwiched by a collector plate 12, an insulator plate 13 for of electric insulation and heat insulation, and a tightening plate 14 for maintaining the stacked state by applying a load, and tightened by means of bolts 15 and nuts 17 a tightening load being applied by a plate spring 16.

The solid polymer electrolyte film 1 has a proton exchange group at the molecular level, and functions as a proton electrically conductive electrolyte, as the specific resistance becomes equal to or less than 20 Ω cm2, if the water content is saturated. Thus, because the solid polymer electrolyte film 1 functions as a proton electrically conductive electrolyte by containing water, in the solid polymer type fuel cell, a method to operate by supplying each element cell 11 with reaction gas saturated with water vapor is adopted.

When the fuel electrode 7 is supplied with a fuel gas containing hydrogen, and the air electrode 6 is supplied with an oxidant gas containing oxygen, the fuel cell electrode reaction for decomposing hydrogen molecular into hydrogen ions and electrons takes place in the fuel electrode 7 and the following electric chemical reaction occurs for generating water from oxygen, hydrogen ions and electrons in the air electrode 6, respectively, where the load is supplied with power by electrons moving in an external circuit from the fuel electrode towards the air electrode, resulting in the production of water at the air electrode side.

Fuel electrode; $H_2 \rightarrow 2H^+ + 2e^-$ (fuel electrode reaction)

Air electrode; $2H^+ + (\frac{1}{2})O_2 + 2e^- \rightarrow H_2O$ (air electrode reaction)

Whole; $H_2 + (\frac{1}{2})O_2 + \rightarrow H_2O$

Thus, in addition to water produced by the reaction at the air electrode 6 side, water moving from the fuel electrode 7 side to the air electrode 6 side along with the movement of hydrogen ions also results.

Therefore, the gas diffusion layers 4 and 5 are required to assure the functions of 1) supplying the catalyst layer evenly with reaction gas to be supplied, 2) conducting the current to the outside, 3) controlling satisfactorily the supply/discharge of reaction produced water and moving water, or other functions.

Consequently, in the prior art, as gas diffusion layer 4 and 5, carbon paper, carbon cloth or other electrically conductive porous material, the electrically conductive porous material subjected to the water repellent treatment, or material coated with a mixture formed of carbon powder and water repellent filler on the electrically conductive porous material have been used.

However, the conventional gas diffusion layer is expensive and, moreover, in case of carbon paper, it has been manufactured in batch because its mechanical strength is low, making difficult to form continuously with respect to the electrode manufacturing, it resulting in poor productivity.

SUMMARY OF THE INVENTION

The first object of the present invention is to solve the problems of the prior art and to supply inexpensive gas diffusion layer arrangement for a fuel cell excellent in water repellency, and which is also excellent in mechanical strength, allowing a continuous formation.

The second object of the present invention is to provide a method for manufacturing easily such a gas diffusion layer arrangement for fuel cell.

The inventors have studied diligently in order to solve the problems of the prior art, and as a result, have found that the problems can be solved by using a gas diffusion layer formed by using a mesh sheet having a heat resistance and an acid resistance such as, for example, stainless mesh, and filling voids of the sheet with a mixture of electrically conductive powder, such as carbon powder, and water repellent filler, such as fluorine resin, and has devised the present invention.

In short, the gas diffusion layer for a fuel cell of the present invention is a gas diffusion layer used for at least one of gas diffusion layers of a fuel cell where a fuel electrode side catalyst layer and an air electrode side catalyst layer are disposed at both faces of an electrolyte film, and further a gas diffusion layer is disposed respectively on the outer surface of the fuel electrode side catalyst layer and air electrode side catalyst layer, wherein the gas diffusion layer is formed of a mesh sheet having an heat resistance and an acid resistance, and a mixture of electrically conductive powder and water repellent filler for filling voids of the mesh sheet.

A second gas diffusion layer may be stacked on a face of the first gas diffusion layer in contact with the catalyst layer, the second gas diffusion layer being formed of the mixture of electrically conductive powder and water repellent filler, and presenting a void rate smaller than that of the first gas diffusion layer.

The content of water repellent filler contained in the second gas diffusion layer is preferably greater than the content of water repellent filler contained in the first gas diffusion layer.

The fiber forming the mesh sheet is preferably coated beforehand with water repellent material.

The thickness of the second gas diffusion layer is preferably less than that of the first gas diffusion layer.

The electrically conductive powder used for the first gas diffusion layer and the second gas diffusion layer is preferably carbon powder, and the specific surface area of the carbon powder used for the first gas diffusion layer is preferably less than the specific surface area of the carbon powder used for the second gas diffusion layer.

A method of manufacturing the gas diffusion layer (precursor) using the mixture of electrically conductive powder, water repellent filler and hole making agent powder, or stacking further the second gas diffusion layer (precursor) and, thereafter, decomposing and scattering the hole making agent by heat treatment to form a gas diffusion layer having there fine holes.

BRIEF DESCRIPTION OF THE DRAWINGS

FIG. 1(a) is an illustrative drawing showing schematically the cross-section view of one embodiment of gas diffusion layer arrangement for a fuel cell of the present invention, while

DETAILED DESCRIPTION OF THE PREFERRED EMBODIMENT

Now embodiments according to the present invention will be described in detail referring to the attached drawings.

Figure 1A:
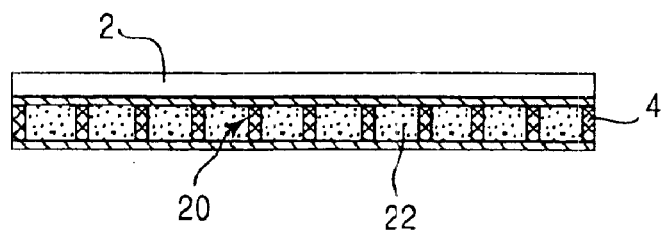
Figure 1B:
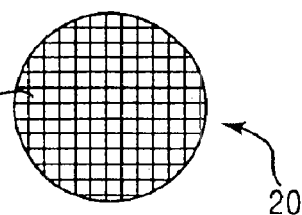
FIG. 1(b) is a plan illustrative drawing of a mesh and porous sheet having a heat resistance.

FIG. 1(a) is an illustrative drawing showing schematically the cross-section of first embodiment of a gas diffusion layer arrangement for a fuel cell of the present invention, while FIG. 1(b) is a plan illustrative drawing of a mesh and porous sheet having a heat resistance.

Figure 6:
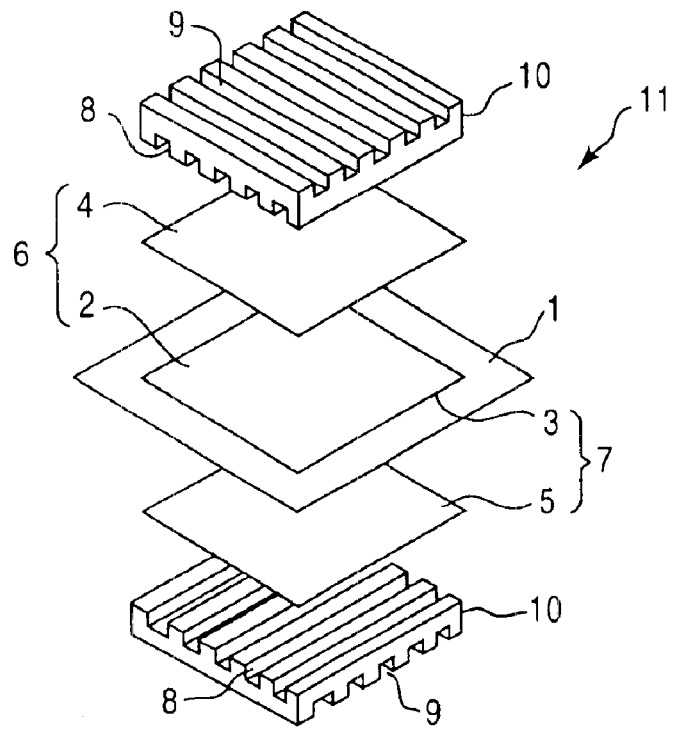
FIG. 6 an exploded cross-sectional view showing a basic configuration of an element cell of solid polymer type fuel cell which is one embodiment of the fuel cell.
Figure 7:
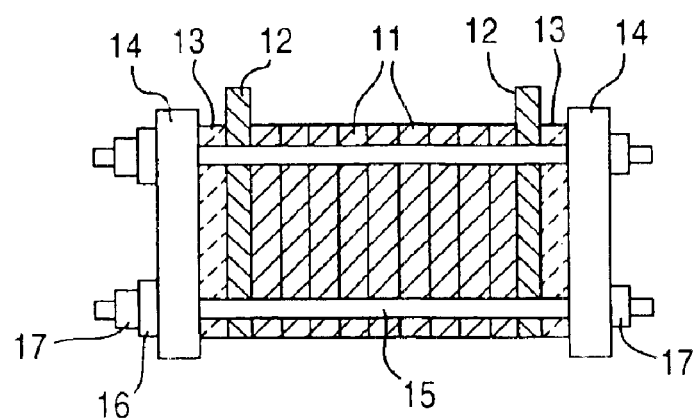
FIG. 7 a cross-sectional view showing a basic composition of a solid polymer type fuel cell stack.

In FIG. 1(a) and FIG. 1(b), it should be appreciated that the same components as components shown in FIG. 6 shall be referenced with the same symbols, and their duplicate explanations will be omitted.

As shown in FIG. 1(a), a gas diffusion layer 4 for a fuel cell of the present invention is formed by filling voids 21 of a mesh sheet 20 having a heat resistance and an acid resistance as a metal mesh with a mixture 22 of electrically conductive powder such as carbon powder and water repellent filler such as fluorine. A catalyst layer 2 is formed evenly on the upper portion of the gas diffusion layer for fuel cell 4.

The material of the mesh sheet 20 having a heat resistance and an acid resistance used for the present invention is not particularly limited, and for example, metals, ceramics, glass, engineering plastics or the others can be used. As metal, to be more specific, for example, stainless steel base metals (SUS316, SUS304, or others), titanium or titanium alloys or others can be cited. The hole diameter of the mesh sheet 20 is also not particularly limited, but it is preferable to used those on the order of about 70 to 95% in the porosity. The form of the mesh sheet 20 is also not particularly limited, and any of metal gauze form, plain weave form, textile cloth form, mesh form, punching metal form can be used.

The mesh sheet 20 having a high mechanical strength can play the role of cell support member. Being formed by filling voids 21 of the mesh sheet 20 with the mixture 22 of electrically conductive powder such as carbon powder and water repellent filler such as fluorine, it is excellent in gas permeability, water repellency or others, can supply the catalyst layer with reaction gas by diffusing sufficiently, and at the same time, can discharge reaction produced water or moving water satisfactorily. Moreover, an excellent mechanical strength thereof allows easy continuous formation, thereby providing an inexpensive gas diffusion layer.

Though the mesh sheet 20 can be used as it is, it is preferable to coat beforehand the fibers of the mesh sheet 20 with water repellent material such as fluorine resin. Such preliminary coating increases the water repellency in the proximity of the fabric of the mesh sheet 20, improves and maintains the gas permeability, and at the same time, the water repellent material acts as an adhesive between the fabric and the electrically conductive powder such as carbon powder, and prevents conductive powder such as carbon powder from falling from the gas diffusion layer for fuel cell 4.

As water repellent filler, to be more specific, for example polytetrafluoroethylene, perfluorocarbon sulfonic acid, tetrafluoroethylene-perfluoroalkylvinyl ether copolymer, tetrafluoroethylene-hexafluoropropylene copolymer, polychlorotrifluoroethylene, polyfluorovynilidene, polyfluorovinyl, and tetrafluoroethylene-ethylene copolymer or others can be cited.

To be more specific, as electrically conductive powder, for example, carbon powder, graphite powder, carbon fiber powder, metal powder, metal fiber powder, metal plating ceramics can be cited.

Figure 2A:
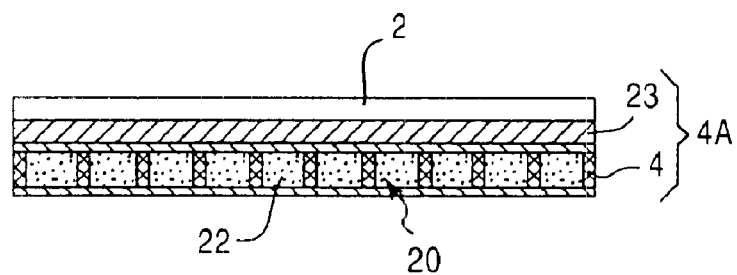
FIG. 2(a) is an illustrative drawing showing schematically cross-sectional view of another embodiment of a gas diffusion layer arrangement for a fuel cell of the present invention, while (b) is a plan illustrative drawing of a mesh sheet having a heat resistance and an acid resistance.
Figure 2B:
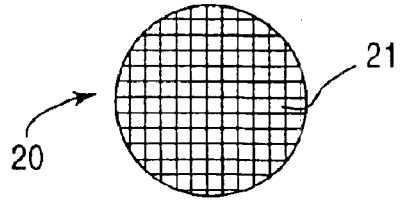

FIG. 2(a) is an illustrative drawing showing schematically the cross-section of another embodiment of gas diffusion layer for fuel cell of the present invention, while FIG. 2(b) is a plan illustrative drawing of a mesh sheet having a heat resistance and an acid resistance.

In FIG. 2(a) and FIG. 2(b), it should be appreciated that the same components as components shown in FIG. 6 shall be referenced with the same symbols, and their duplicate explanations will be omitted.

As shown in FIG. 2(a), in the gas diffusion layer arrangement 4A for a fuel cell of the present invention, the gas diffusion layer 4 is formed by filling voids 21 of a mesh sheet 20 having a heat resistance and an acid resistance as a metal mesh with a mixture 22 of electrically conductive powder such as carbon powder and water repellent filler such as fluorine. A second gas diffusion layer 23 is formed of a mixture of electrically conductive powder and water repellent filler in the same composition ratio as the mixture 22 or in a different composition ratio thereof on a face of the gas diffusion layer 4 to be come into contact with the catalyst layer 2 of the gas diffusion layer 4. The second gas diffusion layer 23 presenting a void rate less than that of the gas diffusion layer 4 is stacked. The catalyst layer 2 is formed uniformly on the upper portion of the second gas diffusion layer 23.

By adopting this composition, in the gas diffusion layer arrangement for a fuel cell 4A of the present invention, the gas diffusion layer 4 having a mesh sheet 20 of high mechanical strength can play the role of cell support member, while the second gas diffusion layer 23 permits formation of a more uniform catalyst layer 2. Besides, because the second gas diffusion layer 23 presenting a void rate smaller than that of the first gas diffusion layer 4 is stacked upon the first gas diffusion layer 4, the second gas diffusion layer 23 can satisfactorily control the supply/discharge of reaction produced water and moving water.

Though the content of water repellent material contained in the second gas diffusion layer 23 is not particularly limited, it is preferably greater than the content of water repellent material contained in the first gas diffusion layer 4. Evaporation and scattering of reaction produced water and moving water into the reaction gas can be controlled by increasing the content of water repellent material contained in the first gas diffusion layer 4.

Though the mesh sheet 20 can be used as it is, as mentioned above, it is preferable to coat beforehand the fabric of the mesh sheet 20 with a water repellent material such as fluorine resin, because such preliminary coating increases the water repellency in the proximity of the fabric of the mesh sheet 20, improves and keeps the gas permeability, and at the same time, the water repellent material acts as adhesive between the fabric and the electrically conductive powder such as carbon powder, and prevents conductive powder such as carbon powder from falling from the gas diffusion layer for fuel cell 4.

The thickness of the second gas diffusion layer 23 is not limited particularly. It is preferable that the thickness of the second gas diffusion layer 23 be to less than the thickness of the gas diffusion layer 4. By doing this, the effect of the second gas diffusion layer 23 presenting a lower gas diffusion capacity can be limited, and the gas diffusion of the entire cell can be maintained.

The electrically conductive powder used for the first gas diffusion layer 4 and the second gas diffusion layer 4A is not specified particularly. However, carbon powder, being inexpensive and easily available, can be used preferably as electrically conductive powder. Moreover, it is preferable that the specific surface area of the carbon powder of the gas diffusion layer 4 be less than the specific surface area of the carbon powder of the second gas diffusion layer 23.

Whereby, the absorbency of the first gas diffusion layer 4 becomes greater than that of the second gas diffusion layer 23, allowing to move excessive moisture in the second gas diffusion layer 23 and evaporate in the gas, without stagnation or detention.

Figure 3:
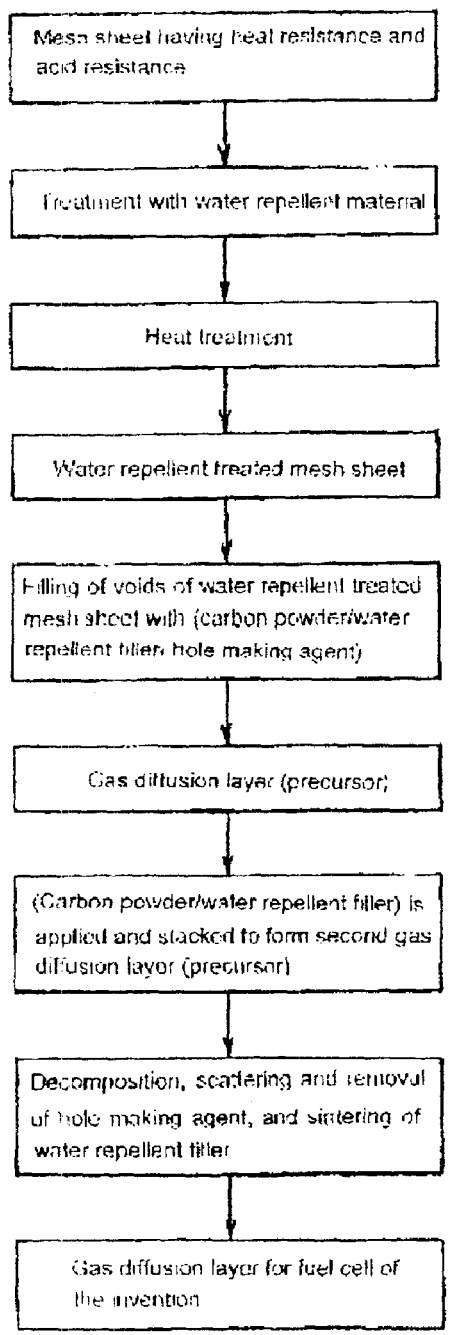
FIG. 3 an illustrative drawing showing the manufacturing method of one embodiment of a gas diffusion layer arrangement for a fuel cell of the present invention.

FIG. 3 is an illustrative drawing showing the manufacturing method of one embodiment of gas diffusion layer for fuel cell of the present invention shown in FIG. 2.

As shown in FIG. 3, first, a mesh sheet having a heat resistance and a acid resistance as metal mesh is prepared, and then, treated with emulsion of water repellent material such as fluorine resin, and a water repellent treated mesh sheet is made by heat treatment.

Thereafter, a first gas diffusion layer (precursor) is formed by filling voids of the water repellent treated mesh sheet with a mixture of electrically conductive powder, water repellent filler and hole making agent powder. Then, the second gas diffusion layer (precursor) is formed by applying and stacking the mixture of electrically conductive powder and water repellent filler on the first gas diffusion layer (precursor).

Though, in the aforementioned embodiment, the second gas diffusion layer (precursor) is heat treated after stacking, the second gas diffusion layer may also be formed after the heat treatment of the first gas diffusion layer (precursor) before stacking the second gas diffusion layer (precursor) for obtaining a gas diffusion layer by decomposing, scattering and removing the hole making agent.

By the manufacturing method, it becomes possible to manufacture easily the gas diffusion layer arrangement for a fuel cell of the present invention where the void rate of the gas diffusion layer arrangement is changed only by adding steps of decomposing, scattering and removing the hole making agent.

EMBODIMENT OR EXAMPLE

Now the present invention shall be described more in detail referring to examples and comparison examples; however, the present invention is not limited by these examples.

Example 1

(1) A metal mesh made of SUS316 (line diameter 0.2 mm) is soaked in a FEP dispersion adjusted to the specific weight of 1.09 and thereafter, dried, and heat treated (360° C. 30 min) to prepare a metal mesh having a FEP layer partially formed on the surface.

(2) Vulcan XC-72 (specific surface area: 250 to 300 m3/g) 7 g, PTFE (polytetrafluoro ethylene) powder (PTFE 6CJ) 3 g and hole making agent powder (ammonium acid carbonate) 14 g are mixed using kerosene as dispersion medium, and excessive kerosene is removed. The obtained mixture is formed into a sheet by rollers.

(3) The sheet mold obtained by the aforementioned (2) and the metal mesh obtained by the aforementioned (1) are stacked, calendered and thereby finished to a thickness substantially equal to the metal mesh thickness, and a sheet shape mold [first gas diffusion layer (precursor)] where voids of the metal mesh is filled with the aforementioned mixture is obtained.

(4) Hole making agent powder (ammonium acid carbonate) is decomposed, scattered and removed through the heat treatment of the sheet shape mold obtained in the aforementioned (3) at 60° C. for 30 min, to prepare a first gas diffusion layer (precursor).

(5) Vulcan XC-72 6 g, 60 weight 5 of PTFE dispersion 6.67 g are mixed using terpionel as dispersion medium, to prepare a past having an appropriate viscosity.

(6) The paste obtained in the aforementioned (5) is applied to the sheet [first gas diffusion layer (precursor)] obtained in the aforementioned (4) to a thickness of the order of 0.05 mm and, thereafter, dried at 60° C. for 30 min, and a second gas diffusion layer (precursor) is stacked on the first gas diffusion layer (precursor).

(7) After drying, the gas diffusion layer arrangement for a fuel cell of the present invention is made by sintering PTFE (water repellent filler) through heat treatment of 360° C. for 30 min.

Example 2

(1) A metal mesh made of SUS316 (line diameter 0.2 mm) is soaked in a FEP dispersion adjusted to the specific weight of 1.09 and thereafter, dried, and heat treated (360° C. 30 min) to prepare a metal mesh having a FEP layer partially formed on the surface.

(2) Ketjenblack (specific surface area: 800 m3/g) 7 g, PTFE powder (PTFE 6 CJ) 3 g and hole making agent powder (ammonium acid carbonate) 14 g are mixed using kerosene as dispersion medium, and excessive kerosene is removed. The obtained mixture is formed into a sheet by rollers.

(3) The sheet mold obtained by the aforementioned (2) and the metal mesh obtained by the aforementioned (1) are stacked, calendered and thereby finished to a thickness substantially equal to the metal mesh thickness, and a sheet shape mold [first gas diffusion layer (precursor)] where voids of the metal mesh are filled with the aforementioned mixture is obtained.

(4) Hole making agent powder (ammonium acid carbonate) in the sheet shape mold [first gas diffusion layer (precursor)] is decomposed, scattered and removed through the heat treatment of the sheet shape mold [first gas diffusion layer (precursor)]obtained in the aforementioned (3) at 360° C. for 30 min, after having dried at 60° C. for 30 min, and at the same time, PTFE (water repellent filler) is sintered to prepare a first gas diffusion layer.

(5) Vulcan XC-72 6 g, 60 weight % of PTFE dispersion 6.67 g are mixed using terpionel as dispersion medium, to prepare a past having an appropriate viscosity.

(6) The paste obtained in the aforementioned (5) is applied to the sheet (first gas diffusion layer) obtained in the aforementioned (4) to a thickness of the order of 0.02 mm and, thereafter, dried at 60° C. for 30 min, and a second gas diffusion layer (precursor) is stacked.

(7) After drying, the gas diffusion layer for fuel cell of the present invention is made by sintering PTFE (water repellent filler) in the second gas diffusion layer (precursor) through a heat treatment of 360° C. for 30 min.

Comparison Example 1

(1) A carbon paper TGP-060 (thickness: 0.2 mm) made by TORAY Co., LTD. is soaked in a PTFE dispersion adjusted to a specific weight of 1.10 and thereafter, dried, and heat treated (360° C., 30 min).

(2) Vulcan XC-72 6 g, 60 weight % of PTFE dispersion 6.679 g are mixed using terpionel as dispersion medium, to prepare a past having an appropriate viscosity.

(3) The paste obtained in the aforementioned (2) is applied to the sheet obtained in the aforementioned (1) to a thickness of the order of 0.02 mm and, thereafter, dried at 60° C. for 30 min, to make a gas diffusion layer.

After drying, the gas diffusion layer for comparison is formed by sintering PTFE (water repellent filler) through a heat treatment of 360° C. for 30 min.

[Element Cell for Test]

An element cell for a test of an electrode area of 25 cm$^2$ is prepared for evaluation of respective cells, by making the gas diffusion layer arrangement prepared in the Examples 1 and 2 and Comparison Example 1 the air electrode side gas diffusion layer, and using the gas diffusion layer arrangement prepared in the Comparison Example 1 as the fuel electrode side gas diffusion layer arrangement for all.

[Test Results]

Figure 4:
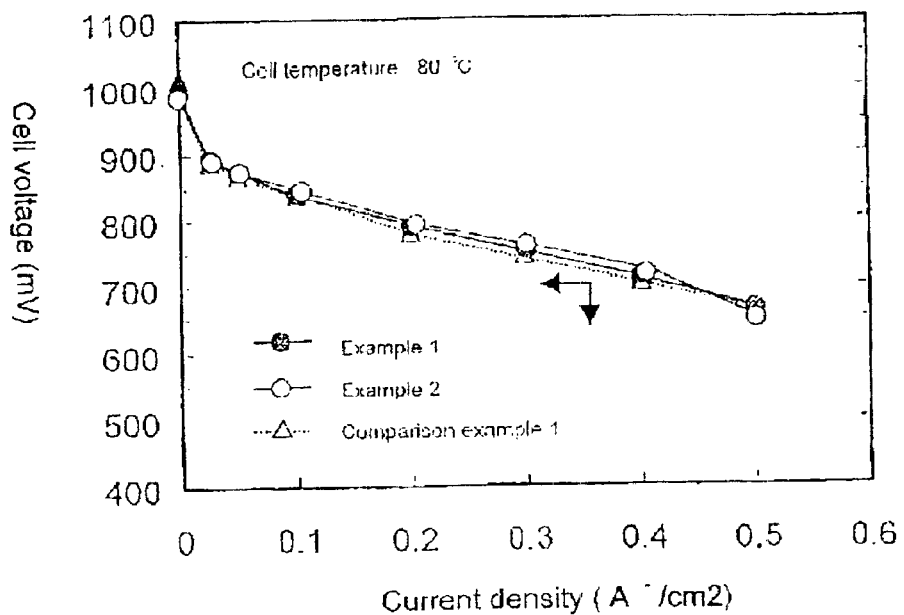
FIG. 4 a graph showing the relation between cell voltage—current density.

FIG. 4 shows the current voltage characteristics of the element cell using the gas diffusion layer arrangement of the Examples 1 and 2 and Comparison Example 1. In every element cell prepared by any of Examples, performances substantially equal to the comparison example 1 can be obtained.

Figure 5:
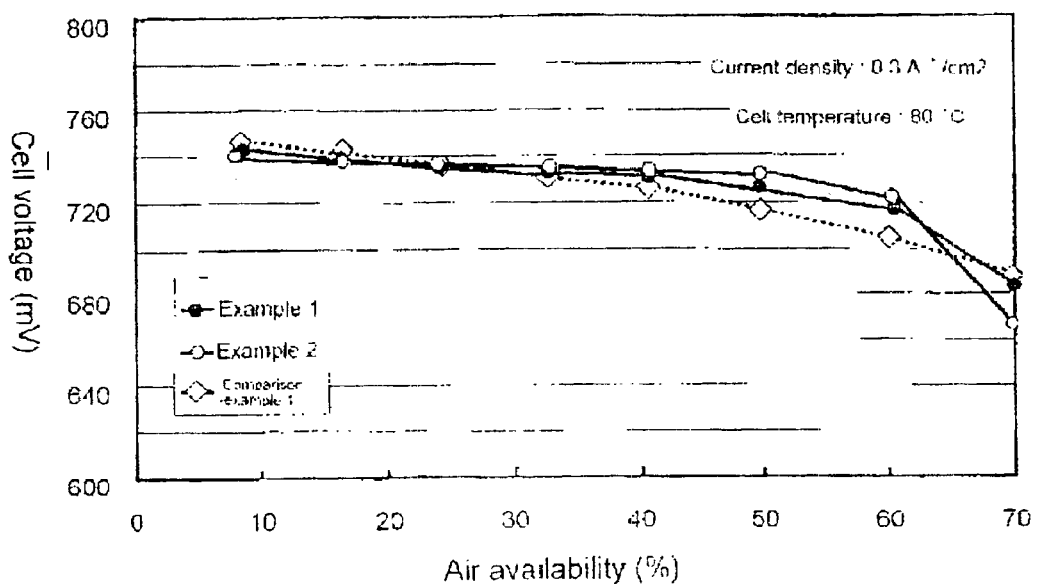
FIG. 5 a graph showing the relation between cell voltage—air availability.

FIG. 5 shows the air availability dependency of cell voltage in each element cell of the Examples 1 and 2 and Comparison Example 1. In case of Example 2, the voltage tends to lower suddenly at the high air availability side, while the voltage drop amount at the lower air availability side tends to become smaller than that of the conventional example and the Example 1, whereby, performances substantially equal to the comparison example 1 can be obtained.

The gas diffusion layer arrangement for a fuel cell of the present invention being formed of a mesh sheet having a heat resistance and an acid resistance, and a mixture of electrically conductive powder and water repellent filler for filling voids of the mesh sheet, it becomes possible to prepare the gas diffusion layer occupying a large part of the material cost of the element cell of fuel cell at a low cost, and a high strength and inexpensive material can be used as mesh sheet and, moreover, a production excellent in mass productivity is enabled as it becomes possible to take up the gas diffusion layer (sheet) by using a flexible material as a mesh sheet, and also the mesh sheet plays the role of cell support as it present a high mechanical strength, or other remarkable effects are deployed.

Besides, the gas diffusion layer arrangement of the present invention is excellent in gas permeability and water repellency, and exhibits a remarkable effect of being able to supply the catalyst layer with reaction gas by well diffusing, and at the same time, to discharge reaction produced water and moving water satisfactory.

A second gas diffusion layer is preferably stacked on a face of the first gas diffusion layer in contact with the catalyst layer, the second gas diffusion layer being preferably formed of the mixture of electrically conductive powder and water repellent filler, and presenting a void rate smaller than that of the first gas diffusion layer. Furthermore, the second gas diffusion layer allows formation of a more uniform catalyst layer, and moreover, allows satisfactory control of the supply/discharge of reaction produced water and moving water.

The content of water repellent filler contained in the second gas diffusion layer is preferably formed higher than the content of water repellent filler contained in the first gas diffusion layer and has a remarkable effect of controlling the evaporation scattering of reaction water and moving water to the reaction gas.

The fiber forming the mesh sheet is preferably coated beforehand with water repellent material and, thereby, enhances the water repellency in the vicinity of the fiber of mesh sheet, improving and keeping the gas permeability, and making the repellent material to act as adherent between the fiber and the electrically conductive powder as carbon powder, thereby preventing the electrically conductive powder as carbon powder from falling from the gas diffusion layer arrangement for a fuel cell.

The thickness of the second gas diffusion layer is less than that of the first gas diffusion layer, whereby, the effect of the second gas diffusion layer poor in gas diffusion is reduced, and has a remarkable effect of maintaining the gas diffusion of the whole cell.

The electrically conductive powder used for the first gas diffusion layer and the second gas diffusion layer is carbon powder, which is easily available and cheap, and the specific surface area of the carbon powder used for the first gas diffusion layer is made than the specific surface area of the carbon powder used for the second gas diffusion layer, thereby, the absorbency of the first gas diffusion layer becomes greater than that of the second gas diffusion layer, allowing excess moisture in the second gas diffusion layer to move and evaporate in the gas, without stagnation or detention.

The manufacturing method of the gas diffusion layer for a fuel cell of the present invention has a remarkable effect of permitting easy manufacturing of a gas diffusion layer for fuel {{cell)}} wherein the void rate of the gas diffusion layer is changed as will, only by adding the step of decomposing, scattering and evaporating the hole making agent.

What is claimed is:

1. A gas diffusion layer arrangement for a fuel cell used for at least one of gas diffusion layers of a fuel cell where a fuel electrode side catalyst layer and an air electrode side catalyst layer are disposed at both faces of an electrolyte film, and further gas diffusion layers are disposed respectively on the outer surfaces of the fuel electrode side catalyst layer and air electrode side catalyst layer, comprising a first gas diffusion layer formed of a mesh sheet having a heat resistance and an acid resistance, and a mixture of electrically conductive powder and water repellent filler contained entirely within voids of said mesh sheet, wherein a second gas diffusion layer is stacked on a face of said first gas diffusion layer in contact with said catalyst layer, the second gas diffusion layer being formed of the mixture of electrically conductive powder and water repellent filler, and presenting a void rate smaller than that of said first gas diffusion layer.

2. The gas diffusion layer arrangement for a fuel cell as recited in claim 1, wherein the content of water repellent filler contained in the second gas diffusion layer is greater than the content of water repellent filler contained in said first gas diffusion layer.

3. The gas diffusion layer arrangement for a fuel cell as recited in any of claims 1 to 2, wherein fibers forming said mesh sheet are coated beforehand with water repellent material.

4. The gas diffusion layer arrangement for a fuel cell as recited in any of claims 1 to 2, wherein the thickness of the second gas diffusion layer is less than that of said first gas diffusion layer.

5. The gas diffusion layer arrangement for a fuel cell as recited in any of claims 1 to 2, wherein the electrically conductive powder used for said first gas diffusion layer and the second gas diffusion layer is carbon powder, and a specific surface area of the carbon powder used for said first gas diffusion layer is smaller than the specific surface area of the carbon powder used for the second gas diffusion layer.

* * * * *